United States Patent [19]
Ritchey et al.

[11] Patent Number: 6,067,875
[45] Date of Patent: May 30, 2000

[54] HANDLEBAR-MOUNTED BICYCLE SHIFTER SYSTEM AND METHOD

[75] Inventors: Thomas Widdicombe Ritchey, Palo Alto; Johannes Schneeberger, San Francisco, both of Calif.

[73] Assignee: Ritchey Designs, Inc., Redwood City, Calif.

[21] Appl. No.: 09/096,758

[22] Filed: Jun. 12, 1998

[51] Int. Cl.[7] .......................... B62K 23/04; B62M 25/04
[52] U.S. Cl. ............................ 74/502.2; 74/527
[58] Field of Search .................. 74/502.2, 527, 74/489, 473.13, 473.14

[56] References Cited

U.S. PATENT DOCUMENTS

| | | |
|---|---|---|
| 4,900,291 | 2/1990 | Patterson . |
| 4,938,733 | 7/1990 | Patterson . |
| 5,102,372 | 4/1992 | Patterson et al. . |
| 5,197,927 | 3/1993 | Patterson et al. . |
| 5,315,891 | 5/1994 | Tagawa ................................ 74/502.2 X |
| 5,476,019 | 12/1995 | Cheever et al. . |
| 5,524,501 | 6/1996 | Patterson et al. . |
| 5,564,316 | 10/1996 | Larson et al. . |
| 5,577,413 | 11/1996 | Tagawa et al. ..................... 74/502.2 X |
| 5,584,213 | 12/1996 | Larson et al. . |
| 5,823,058 | 10/1998 | Arbeiter .................................. 74/489 |

FOREIGN PATENT DOCUMENTS

| | | |
|---|---|---|
| 0394355B1 | 7/1995 | European Pat. Off. . |
| 0671315A2 | 9/1995 | European Pat. Off. . |
| 0671318A2 | 9/1995 | European Pat. Off. . |
| 0676325A2 | 10/1995 | European Pat. Off. . |
| 0700827A2 | 3/1996 | European Pat. Off. . |
| 0575560B1 | 5/1996 | European Pat. Off. . |

*Primary Examiner*—Mary Ann Battista
*Attorney, Agent, or Firm*—Gray Cary Ware & Freidenrich, LLP

[57] ABSTRACT

A handlebar mounted shifter system and method are provided in which the overall diameter of the shifter is reduced by providing, among other features, an integrated clamp and spring assembly. The shifter housing has a small diameter so that a rider may place his index finger comfortably on top of the housing so that the distance between the rider's hand and the brake actuator is reduced. In addition, the handlebar mounted shifter system may support and guide the shifting cable so that the shifter cable does not flex undesirably.

12 Claims, 12 Drawing Sheets

HANDLEBAR-MOUNTED BICYCLE SHIFTER SYSTEM AND METHOD

BACKGROUND OF THE INVENTION

This invention relates generally to a system and method for shifting a bicycle between gears, and in particular to a system and method for shifting a bicycle between gears using a handlebar-mounted shifter.

Early bicycles typically had a single gear which in combination with a bicycle chain and pedals translated circular motion of a bicycle rider's feet into rotation of a rear wheel. These single gear bicycles provided the rider of the bicycle with a method of transportation, but were not very efficient. Soon, bicycles with three, ten or twenty-one different speeds (e.g., different gears) were created which permitted the rider of the bicycle to select a particular speed and gear to use for a particular type of terrain. For example, a low gear may be used for climbing up a hill while a high gear may be used for riding down the other side of the hill. Typically, a seven gear cassette is rotatably mounted on the rear wheel of the bicycle and the chain of the bicycle was typically shifted between these gears by a rear derailleur mechanism. A front set of gears may also be provided. The rear derailleur is connected to a cable and a lever so that the rear derailleur mechanism translated movement of a rider's hand into shifting of the bicycle chain between gears.

Derailleur type shifting mechanisms for bicycles have typically been actuated by levers supported on some portion of the bicycle, such as the handlebars or the down tube of the bicycle. The levers require a rider to pull the lever back or push the lever forward in order to cause a gear shift of the bicycle. The levers also typically required the rider of the bicycle to remove his/her hands from the handlebar grips in order to actuate the shifter lever. The removal of the rider's hands from the handlebar may cause the rider to lose control of the bicycle. In addition, these levers may be difficult to actuate in muddy conditions. Thus, attempts were made to provide some system for permitting the rider of the bicycle to keep his/her hands on the handlebar of the bicycle while shifting the bicycle between gears.

This has led to the development of a system and method that permits the rider of a bicycle to actuate the shifting mechanism while keeping his/her hands on the handlebar is a grip shifter system and method in which a shift actuator is rotatably mounted on the handlebars so that a rider may shift the bicycle between gears without losing control of the bicycle. One conventional shift actuator is mounted on the handlebar of the bicycle outside of the brake actuator and nearest the end of the handlebar. The shifter may be actuated by rotating the grip. Due to the substantial width and diameter of this grip shift actuator, the pivot point for the brake lever is located some distance away from the rider's hand so that the angular rotation of the brake level is reduced. In addition, to rotate the shift actuator and to be able to actuate the brake lever attached to the brake actuator from one position, the brake lever has to extend a large distance over the shift actuator. The location of the brake lever and the large distance that it extended over the shift actuator make it more difficult for the rider of the bicycle to actuate the brakes of the bicycle because the brake lever had to be pulled a greater distance than typical brake systems. In addition, the position of the rider's hand to actuate the brake lever of the bicycle is not ergonomically correct.

This conventional handlebar-mounted shift actuator also has a metal spring inside the shift actuator which permits the rider of the bicycle to precisely shift between different gears, which is known as index shifting. The metal spring is mounted on an inner drum of the shift actuator. The conventional handlebar-mounted shift actuator also has a clamp, separate from the spring, which secured the actuator to the handlebar of the bicycle. The clamp and spring each had a predetermined thickness, and the thickness of the combination of the clamp and the spring increases the overall diameter of the shift actuator which increases the distance of the pivot point of the brake lever from the rider's hand which reduces the angular rotation of the brake lever during braking and made it difficult for a rider to actuate the brake lever of the bicycle. In addition, the increased diameter of the shift actuator makes it difficult for people with smaller hands to grip the brake lever.

Another conventional handlebar mounted shifter has a grip assembly on each of the handlebar attached to a shifter device. Each shifter device on each end of the handlebar has two levers attached to it which are mounted so that they are below the handlebar and may be actuated by the thumb of a rider. The shifter device has a ratchet within it and depressing the lever causes ratcheting of the ratchet which pulls the shifter cable and shifts the gears of the bicycle. Thus, when one lever is depressed, an upshift occurs while depressing the other level causes a downshift. Using the two shifter devices at each end of the handlebar, a rider may shift the front and rear derailleurs of the bicycle. These levers have a limited amount of surface area so that they may be difficult for a rider to depress the levers in wet or muddy conditions. The levers also permit the rider to apply only a limited amount of force to the levers to shift the gears of the bicycle which may pose a problem when the gears of the bicycle or the shifter cable are fouled with mud. There are also some shifters with regions which permit a rider to use his/her thumb to shift the bicycle, but these shifters do not position the rider's thumb in a good ergonomic position.

These conventional handlebar mounted shifters are not good ergonomic designs (i.e., the hand of the rider is not in a good ergonomic position) and do not fulfill the needs of a shifter mechanism that is often exposed to, for example, mud, which may make it more difficult to shift gears and thus increases the amount of torque that the rider must apply to shift the gears of the bicycle. Thus, due to the problems of these conventional handlebar mounted shifter systems, it is desirable to provide a handlebar-mounted shifting system which positions the rider's hands in an ergonomically correct position, does not make the actuation of the brake more difficult than a conventional braking system and permits a rider to apply more torque, as needed, to shift the gears of the bicycle in muddy conditions. In addition, it is desirable to provide a handlebar-mounted shifting mechanism which has a reduced overall thickness and diameter so that the brake lever does not have to extend a large distance over the shift actuator and the hands of the rider are in a more ergonomically correct position to actuate the brake. In addition, the reduced diameter shifter system has a pivot point of the brake lever which is closer to the rider's hand so that the angular rotation of the brake level is increased. It is also desirable to provide a single assembly with a clamp and a spring which reduces the overall diameter of the shifter mechanism. Thus, there is a need for a handlebar-mounted bicycle shifter system and method which avoid these and other problems of known systems and methods, and it is to this end that the present invention is directed.

SUMMARY OF THE INVENTION

The invention provides a handlebar mounted shifter having a smaller diameter than conventional handlebar mounted shifter systems which permits a rider's hand to be in a good ergonomic position. In particular, due to the small diameter of the handlebar mounted shifter in accordance with the invention, a rider may place his index finger on the housing of the shifter so that the rider's hand is closer to the pivot point of the brake lever. In addition, due to the small diameter of the housing, the invention may also include a thumb perch located in a good ergonomic position which permits a rider to apply extra torque to shift the gears of the bicycle in high shifting torque and low grip friction conditions caused by wet or muddy conditions. The invention shifts the gears of the bicycle by rotating a grip. Thus, the invention, with the combination of the rotating grip shifter and the thumb perch, permits the rider to apply torque to the grip in any type of conditions.

The invention provides a handlebar-mounted shifter system and method which has a smaller overall diameter than conventional handlebar-mounted shift actuators so that the rider's fingers may rest on the housing and thus the pivot point of the brake lever is closer to the rider's hand which increases the angular rotation of the brake lever, and it is easier for a rider to actuate the brake lever. The overall diameter of the handlebar-mounted shifter may be reduced by combining the spring and a clamp of the shifter system into a single component which is thinner than the separate clamp and spring. The handlebar mounted shifter may also include, due to the smaller diameter, a mechanism in a good ergonomic position, for permitting the rider to use his thumb to apply torque to the shifter. The handlebar mounted shifter system may be located outboard of the brake actuator.

In accordance with the invention, a gear shifting system located on a handlebar of a bicycle, the bicycle having a brake actuator attached to the handlebar, is provided comprising a first portion that is attached to the handlebar of the bicycle outside of the brake actuator and a second portion that is rotatably attached to the handlebar of the bicycle. A grip portion is attached to the second portion and rotatably attaches to the handlebar of the bicycle such that a rider of the bicycle shifts between gears of the bicycle by rotating the grip portion and second portion of the shifter system with respect to the handlebar and the brake assembly.

In accordance with another aspect of the invention, a combined spring and clamp assembly for use in a gear shifting system located on a handlebar of a bicycle is provided having a clamp for clamping the gear shifting system to the handlebar of the bicycle. The clamp may have a first portion having a shape that secures the assembly to a first portion of the gear shifting system, a curved portion attached to the first portion and fitting around the handlebar, and a tightener for tightening said second portion around said handlebar. A spring slides on the curved portion of the clamp so that the total thickness of the assembly is equal to the thickness of the clamp. The spring may have first and second end portions, a central portion connecting said end portions having a shape that conforms to the handlebar, and a detent located near the center of the central portion. The spring is interlocked onto the clamp, as described below, and may slide on the clamp so that the spring has different flexibility characteristics for upshifting and downshifting to compensate for shifting cable tension. The spring may also permit overshifting as described below.

In accordance with another aspect of the invention, a gear shifting system located on a handlebar of a bicycle is provided in which the bicycle has a brake actuator attached to the handlebar. The shifting system may have a first portion rotatably attached to the handlebar of the bicycle and the first portion may have a plurality of valleys and a region sufficient in size and overlapping the first portion to slide on it so that a rider may exert extra torque on the first portion with his thumb to rotate the first portion. The shifting system may also include a second portion attached to the handlebar of the bicycle. The second portion has an assembly within the second portion having a clamp for attaching said first portion to the handlebar of the bicycle and a spring attached to the clamp for interacting with the valleys of the first portion to shift the gears of the bicycle. The shifting system may also include a grip portion attached to the first portion and rotatably attached to the handlebar of the bicycle such that a rider of the bicycle shifts between gears of the bicycle by rotating the grip portion and first portion of the shifter system with respect to the handlebar and the brake assembly.

DETAILED DESCRIPTION OF A PREFERRED EMBODIMENT

The invention is particularly applicable to a handlebar-mounted shifter system and a handlebar-mounted shift actuator device for a mountain bicycle. It is in this context that the invention will be described. It will be appreciated, however, that the system, method, and device in accordance with the invention has greater utility, such as for road bicycles or other transportation vehicles requiring gear shifting.

Figure 1:
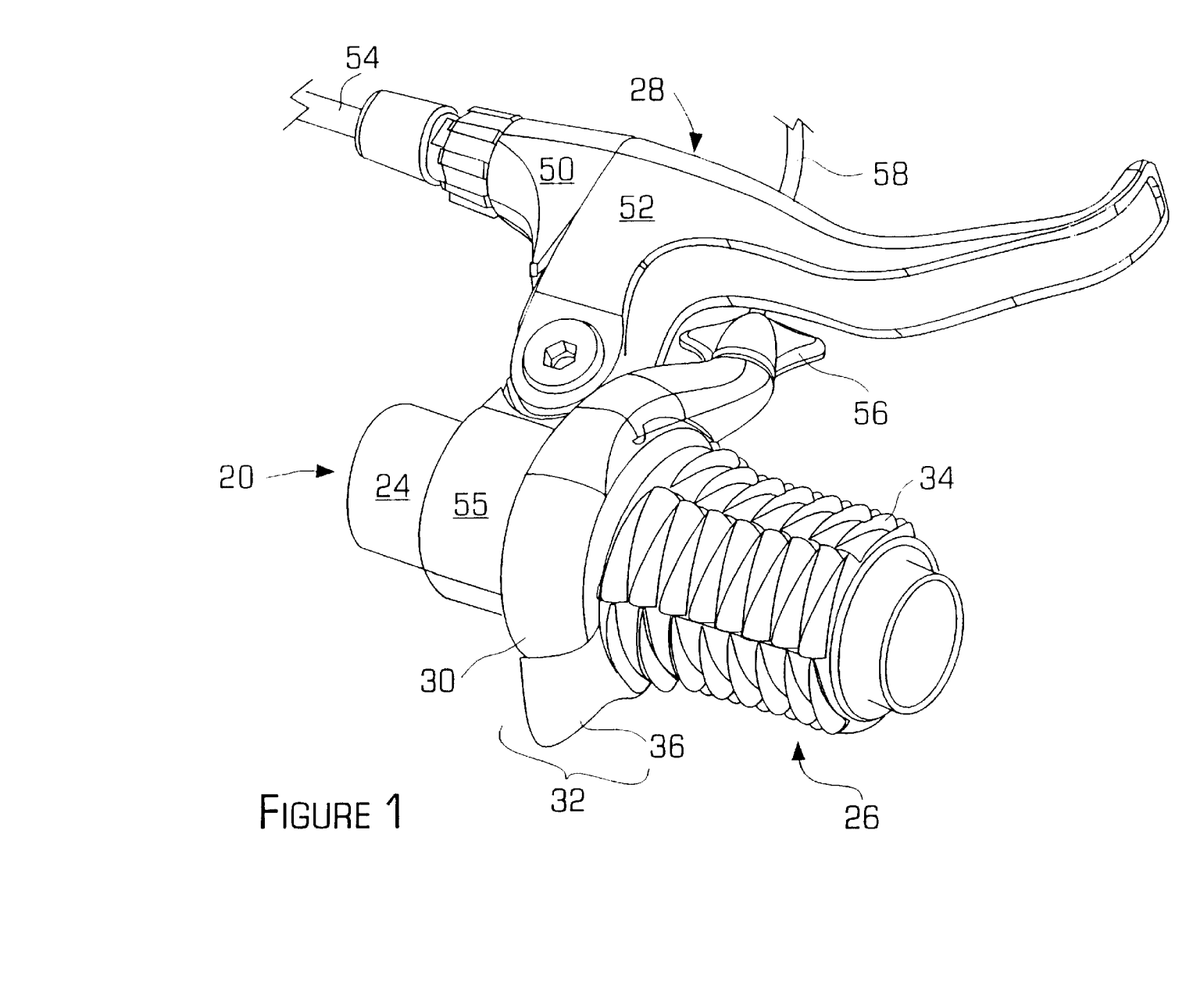
FIG. 1 is a diagram of an assembly with a brake lever including a handlebar mounted shift actuator device of a handlebar-mounted shifter system in accordance with the invention.

FIG. 1 illustrates a perspective view of a portion of a handlebar assembly 20 of a bicycle, such as a mountain bicycle, that may incorporate a handlebar-mounted shifter system in accordance with the invention. The handlebar assembly may include a handlebar 24 to a front wheel (not shown) of the bicycle. The handlebar permits a rider of a bicycle to control the direction of the bicycle by turning the front wheel, as is well known. In a typical bicycle, the shifting actuator devices may be located on the down tube of the bicycle or at the ends of the handlebars which requires the rider of the bicycle to release the handlebar in order to shift gears which may cause a loss of control of the bicycle. In conventional handlebar mounted shifter devices, the shifter does not place a rider's hand in a good ergonomic position and does not permit the rider to apply adequate torque to shift the gears of the bicycle in muddy conditions which may foul the gears of the bicycle or the shifter cable. In accordance with the invention, a handlebar-mounted shifter system 26 may be mounted on the handlebar to position the rider's hand in a good ergonomic position and permit the rider to apply adequate torque to shift the gears of the bicycle in wet and muddy conditions.

Preferably, the handlebar-mounted shifter system 26 comprises two portions, as described below, located outboard of a brake actuator 28 near the end of the handlebar. The shifter system may be mounted on each end of the handlebar so that one shifter can control a front derailleur and the other can control the rear derailleur. The shifter systems for the front and rear derailleur may be substantially the same so that only a single shifter is described. In particular, the shifter system may include a housing portion 30 fixed to the handlebar and a rotatable portion 32 of the handlebar-mounted shifter assembly that rotates with respect to the handlebar and the fixed portion 30, as described below. The rotatable portion may be connected to a grip 34 that is at the end of the handlebar. The grip 34 of the handlebar-mounted shifter system and the rotatable portion 32 are rotatably mounted on the handlebar, as described below, so that the rider of the bicycle may shift the gears of the bicycle by rotating the grip and the rotatable portion, and the rider may also grip the handlebars when not shifting the gears of the bicycle. The fixed housing portion 30 attaches to the rotatable portion 32 so that a portion of the rotatable portion rotates within the fixed portion, as described below, to shift the gears of a bicycle by pulling or pushing a shifting cable. Because the fixed portion has a diameter which is about as same as the rotatable portion and much smaller than conventional handlebar mounted shifter systems, a rider's index finger may rest on top of the housing 30 so the rider's hand is closer to a pivot point of a brake lever 52 so that there is a sufficient amount of angular rotation around the pivot point of the brake lever, as described below. In addition, the small diameter of the fixed portion locates a thumb perch 36 in a good ergonomic position (i.e., in a position where the rider may easily place his thumb onto the thumb perch and apply torque) as the rider grips the grip 34 A cable 58 connects the shifter to a derailleur which is not shown.

The rider of the bicycle may ride the bicycle by gripping the grip 34 on each end of the handlebar and controlling the bicycle. When the rider desires to shift the gears of the bicycle, the rider simply rotates the grip 34 and rotatable portion 32 of the appropriate handlebar-mounted shifter system which pulls or pushes a cable. The cable actuates a rear or front derailleur of the bicycle which changes the gears of the bicycle, as is well known. To aid the rider of the bicycle in rotating the grip, the handlebar-mounted grip shifter may include a thumb perch 36 located near the location of the thumb of the rider while the rider is gripping the grip. During a shift, the rider may position his thumb on the thumb perch which permits the rider to increase the amount of torque that the rider may apply to the grip to shift the gears of the bicycle. This increased torque is essential in downshifting since the rider must overcome a spring force of the derailleur. This increased torque also overcomes any increased cable friction that may be caused by mud fouling the cable. The details of the thumb perch will be described in more detail below.

For reference purposes, a particular type of brake actuator 28 is shown in relation to the handlebar-mounted shifter 26, but any type of brake actuator attached to the handlebar may be used. The brake actuator shown includes a brake body 50, a brake lever 52, a brake cable 54 extending from the brake body and a brake clamp 55 that secures the brake actuator 28 to the handlebar 24. The operation of a brake actuator is well known and will not be described. The rotatable portion 32 of the handlebar-mounted shifter system has a diameter and the housing 30 has a similar small diameter so a rider may place his index finger comfortably on top of the housing so that the rider's hand is closer to the pivot point of the brake lever so that the angular rotation of the brake lever is increased. Because the brake lever is shorter than conventional grip shifter systems and the location of the pivot point, it is easier for the rider of the bicycle to pull the brake lever and places a rider's hand in a more ergonomic position. The fixed housing portion and rotatable portion will now be described in more detail.

The handlebar-mounted shifter system 26 may include the fixed housing portion 30. The fixed housing may have an annular shape and may fit over the handlebar 24. The fixed housing portion may house a single assembly including a clamp and a spring in a particular configuration as described below to allow the housing 30 to have a small diameter which has the advantages described above. The clamp may fixedly attach the housing portion to the handlebar. The spring may interact with a portion of the rotatable portion to provide index shifting, as described below. A cable wingscrew 56 is rotatable attached to the fixed housing 30 and a shifting cable 58 may enter through the wingscrew into the fixed housing. The wingscrew adjusts the tension of the shifting cable to ensure proper shifts between gears, as is well known. The shifting cable 58 connects the shifting system 26 to a derailleur (not shown) which actually shifts between the gears of the bicycle.

The rotatable portion 32 may have an annular shape and may fit over the handlebar 24 and rotate with respect to the handlebar. The rotatable portion may include the thumb perch 36, as described above, and a cable drum 78 shown in FIGS. 2A and 2B. The cable drum may engage the shifting cable 58, as described below. The cable drum may also include a portion that extends into the fixed housing and has a plurality of index valleys described below which cooperate with the spring of the fixed housing portion 30 to provide index shifting of the gears of the bicycle.

The grip 34 is rigidly attached to the rotatable portion 32 so that the grip and the rotatable portion are both rotatably mounted on the handlebar. Thus, the grip and the rotatable portion may rotate relative to the handlebar to shift the gears of the bicycle. To downshift the gears, the rider may position his thumb on the thumb perch and rotates the grip and second portion of the grip shifter system in a first direction. To upshift the gears, the user may press the tip of his index finger on the thumb perch and rotate the grip in an opposite direction. The grip may be manufactured of a rubber compound and may have a pattern of features on its outer surface to increase the rider's grip. Therefore, the thumb perch and/or the features of the grip permit the rider to shift the gears of the bicycle even when the grip is slippery such as during wet or muddy conditions. The thumb perch also permits the rider of the bicycle to apply torque to the grip in order to overcome increased friction of the shifter cable caused by mud fouling the shifter cable. More details of the handlebar-mounted shifter system in accordance with the invention will now be described.

Figure 2A:
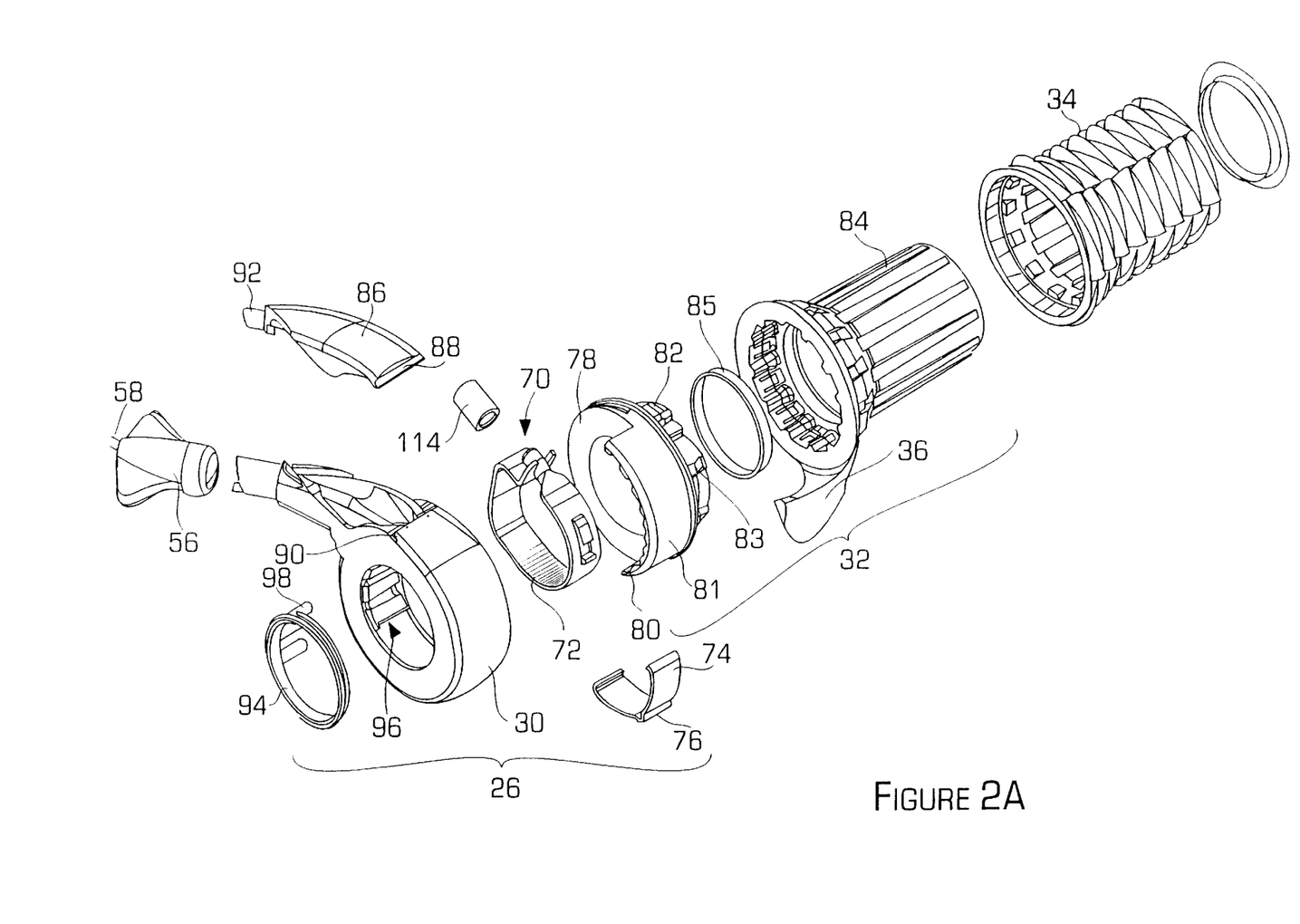
FIGS. 2A and 2B are isometric assembly diagrams illustrating a perspective view of the assembly of the handlebar-mounted shift actuator device of FIG. 1.
Figure 2B:
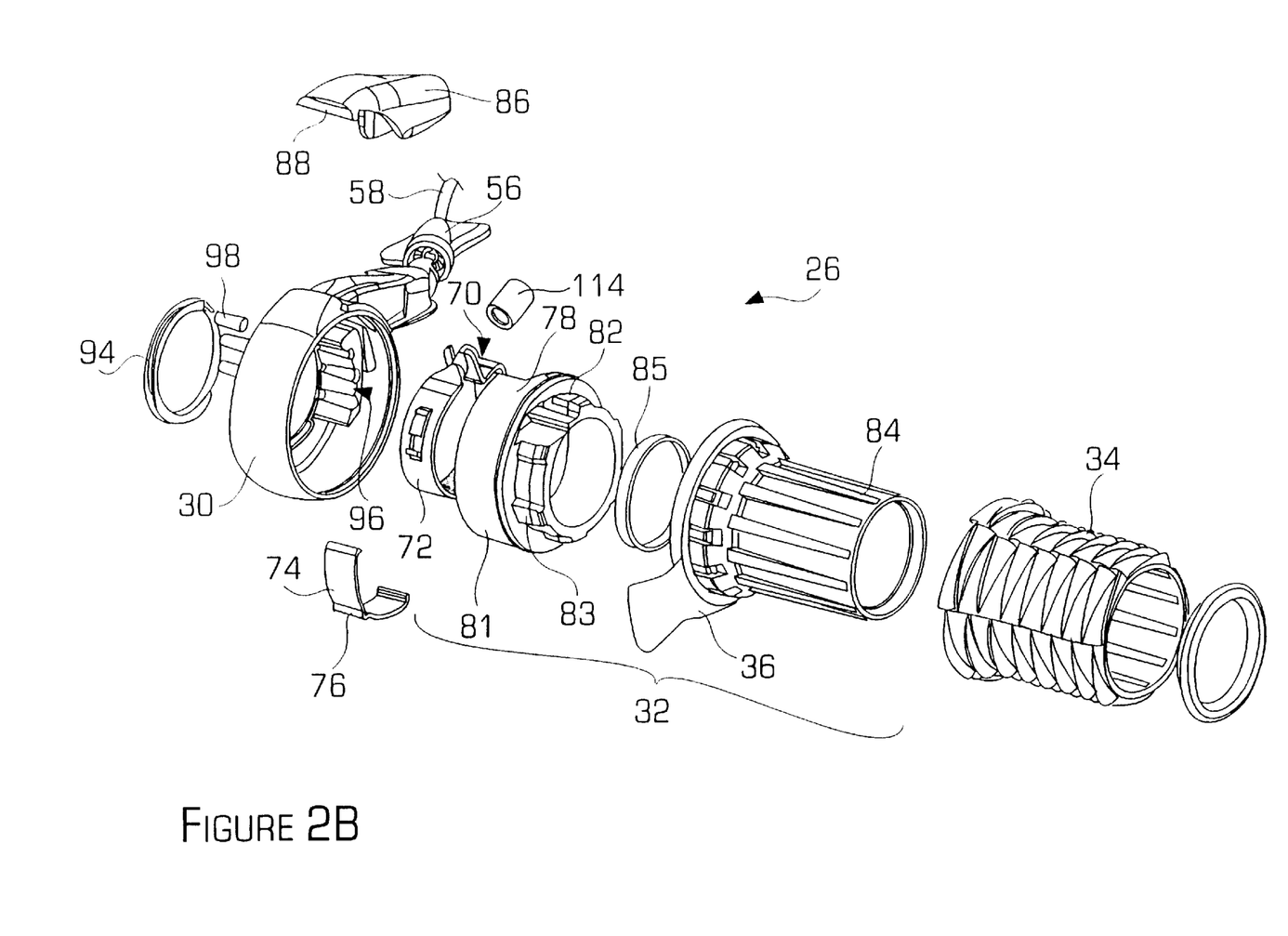

FIGS. 2A and 2B are exploded assembly views of the handlebar-mounted shifter system 26 in accordance with the invention. As described above, the system may include a fixed housing portion 30 and a rotatable portion 32. The fixed housing 30 may further include the wingscrew 56 for adjusting the tension on the shifting cable 58 and an assembly 70 which combines a clamp 72 and a spring 74. The assembly 70 may be mounted within the fixed housing, as described below. The clamp 72 is sized and shaped, as described below, to fit snugly over the handlebar 24 and grip the handlebar when tightened to secure the fixed housing 30 to the handlebar. The spring may have a convex shape and a detent 76 located near the center of the spring which cooperates with a plurality a valleys 80 on a ledge portion 81 of the cable drum 78 that extends into the fixed housing 30 to provide index shifting between gears of the bicycle. The fixed housing and the rotatable portion may be snap fitted together so the two portions do not separate but may rotate with respect to each other. The assembly 70 with the combined clamp and spring, in accordance with the invention reduces the overall diameter of the handlebar-mounted grip shifter and in particular the housing 30 in accordance with the invention. In particular, a rider may comfortably place his index finger on top of the housing 30 in a good ergonomic position so the rider's hand is closer to the brake lever and therefore the pivot point of the brake lever is closer to the rider's hand so it is easier to actuate the brake lever since the brake lever may have a larger amount of angular rotation during braking. The details of the clamp, the spring, the valleys and the interaction of the spring with the valleys will be described in more detail below.

The rotatable portion 32 may further include, in addition to the thumb perch 36 and the cable drum 78 and the plurality of valleys 80 described above, a cable end retainer (not shown) located on the ledge portion 81 extending into the fixed housing when the housing and rotatable portion are snapped together. The end of the shifting cable 58 may be retained by the cable end retainer 82 so that as the rotatable portion and the grip are rotated relative to the handlebar and the fixed housing 30, the shifter cable 58 may be pulled or pushed depending on the direction of the rotation of the grip. The grip 34, as described above, may be constructed of an elastomeric material, and may be mounted on an annular shaped grip drum 84. The grip drum may be rigidly connected to the rotatable portion 32 so that a rotation of the grip and the grip drum causes a rotation of the rotatable portion 32.

The cable drum 78 may also have a plurality of engaging portions 83 on a side opposite from the ledge portion 81 that engage the other components of the rotating portion and the grip drum so that the grip 34 and the rotating portion are connected together and rotate together. The rotating portion 32 may also include the thumb perch 36, as described above which is attached to the grip drum 84. The thumb perch 36 and the grip drum 84 may be attached to the cable drum 78 by the engaging portions 83 so that any torque applied to the thumb perch 36 by a rider is translated into rotation of the rotating portion 32. The rotating portion may also include a ring 85 that mounts between the thumb perch 36 and grip drum 84 and the cable drum 78.

The housing 30 may further include a cable cover 86 that fits over an opening in the housing 30 and secures the cable 58 in the housing 30 as described below. The cable cover 86 may include a portion 88 which slides into a notch 90 in the housing and a securing portion 92. Once the portion 88 is slid into the notch 90, the cable cover 86 is lowered over the opening. Then, the wingscrew 56 is screwed onto threads on the housing and the securing portion 92 to secure the cable cover 86 to the housing 30. Thus, to adjust or remove the cable, the cable cover 86 is removed. In addition, once the cable cover is removed, there is also access to a nut 114 which may be used to tighten the clamp 72. The details of the cable cover and its function will be described below. The housing may also include a seal 94, which may be an elastomeric material and may fit into a plurality of valleys 96 in the housing 30 in order to help secure the clamp 72 and the housing 30 to the handlebar due to the frictional force between the clamp, the seal and the handlebar. As shown, the seal may have three cylindrical fingers 98 which fit into the valleys 96. Due to the location of these fingers 98, no additional seal material is needed to provide sufficient friction to secure the clamp to the handlebar so that the diameter of the rest of the shifter and the housing is reduced, as described below.

Figure 3A:
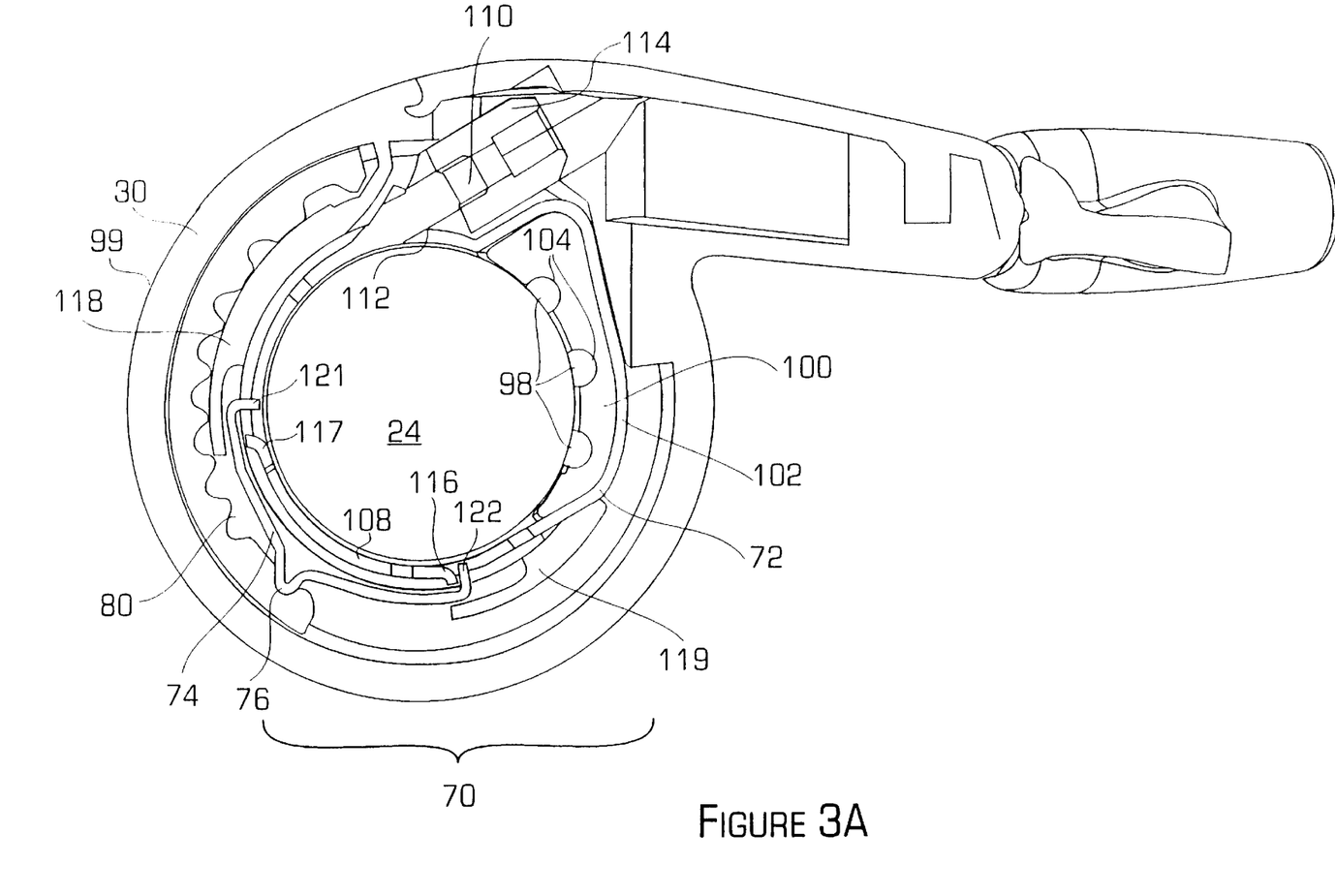
FIGS. 3A and 3B are diagram illustrating details of the fixed portion and the assembly of the handlebar mounted shifter in accordance with the invention.
Figure 3B:
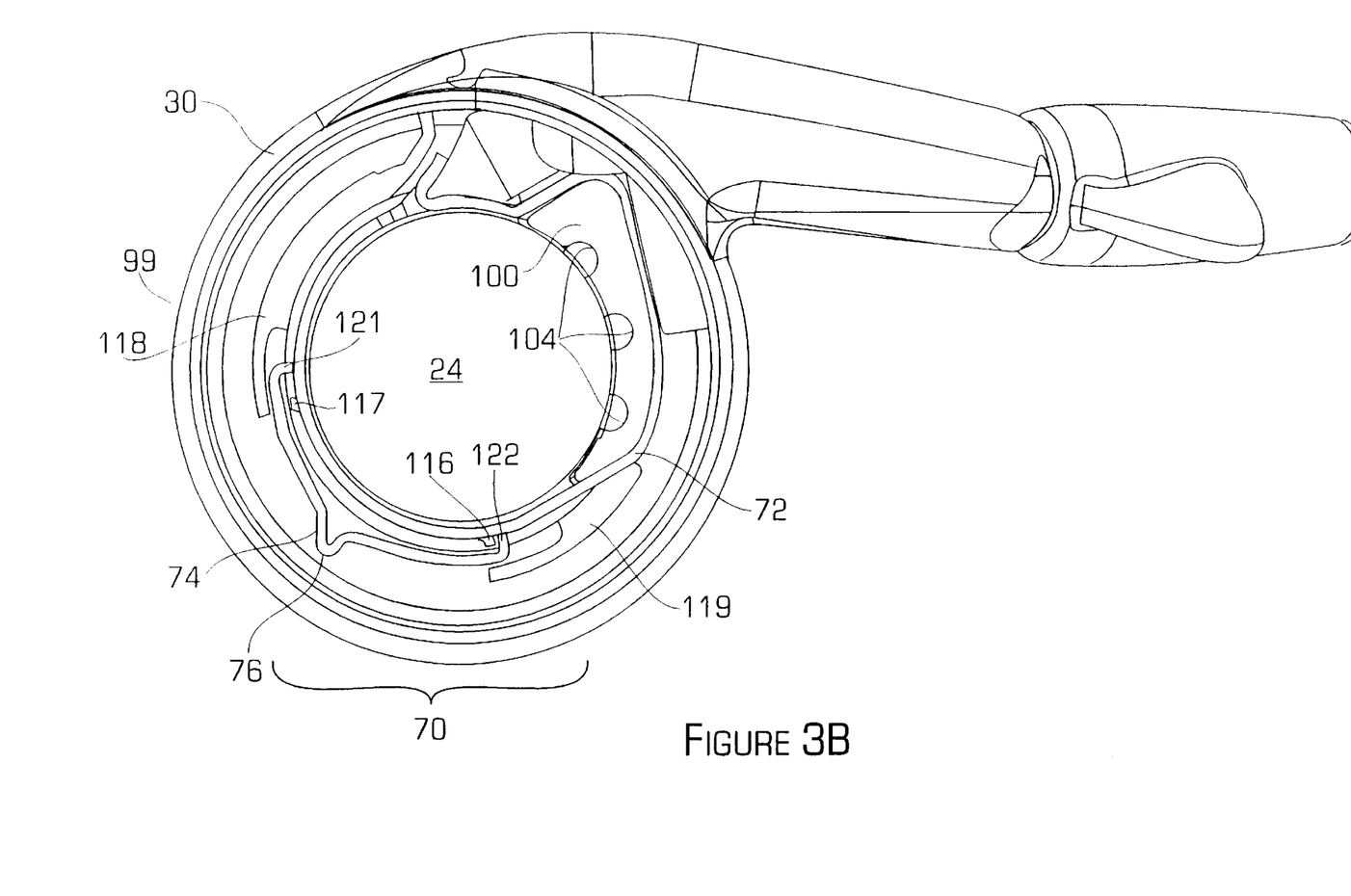

FIGS. 3A and 3B are different perspective views of the housing 30 with the assembly 70 mounted around the handlebar 24 and within the housing 30. In order to reduce the diameter of a portion 99 of the housing 30 near the rider's hand, the clamp 72 is mounted in the housing such that a wedge portion 100 is located away from the rider's hand. In particular, the clamp 72 has a first portion 102 under which the wedge is located. The wedge may be manufactured out of a hard plastic material. To secure the clamp 72 and the housing 30 to the handlebar 24, the fingers 98 of the seal are placed in a plurality of valleys 104 in the wedge to increase the frictional fit between the handlebar and the clamp. As the clamp 72 is tightened around the handlebar 24 by tightening the nut 114, the clamp presses down on the wedge 100 which in turn presses the fingers 98 of the seal down onto the handlebar. The fingers 98 of the seal create additional frictional fit between the fingers, the wedge, the clamp, the housing and the handlebar to prevent the housing or clamp from sliding on the handlebar. As shown, the wedge is not located underneath the portion 99 of the housing near a rider so that the diameter of that portion 99 is smaller than a conventional handlebar mounted shifter since the conventional shifter has some thickness of material completely around the handlebar. Thus, in accordance with the invention, the clamp, wedge and fingers secure the housing 30 to the handlebar, but do not increase the diameter of the portion 99 of the housing near the rider since the clamp 72 is clamped to the handlebar without any seal material underneath the portion 99. Thus, due to this smaller diameter, the rider may place his index finger on the housing 30 to move his hand closer to the brake assembly.

Figure 4:
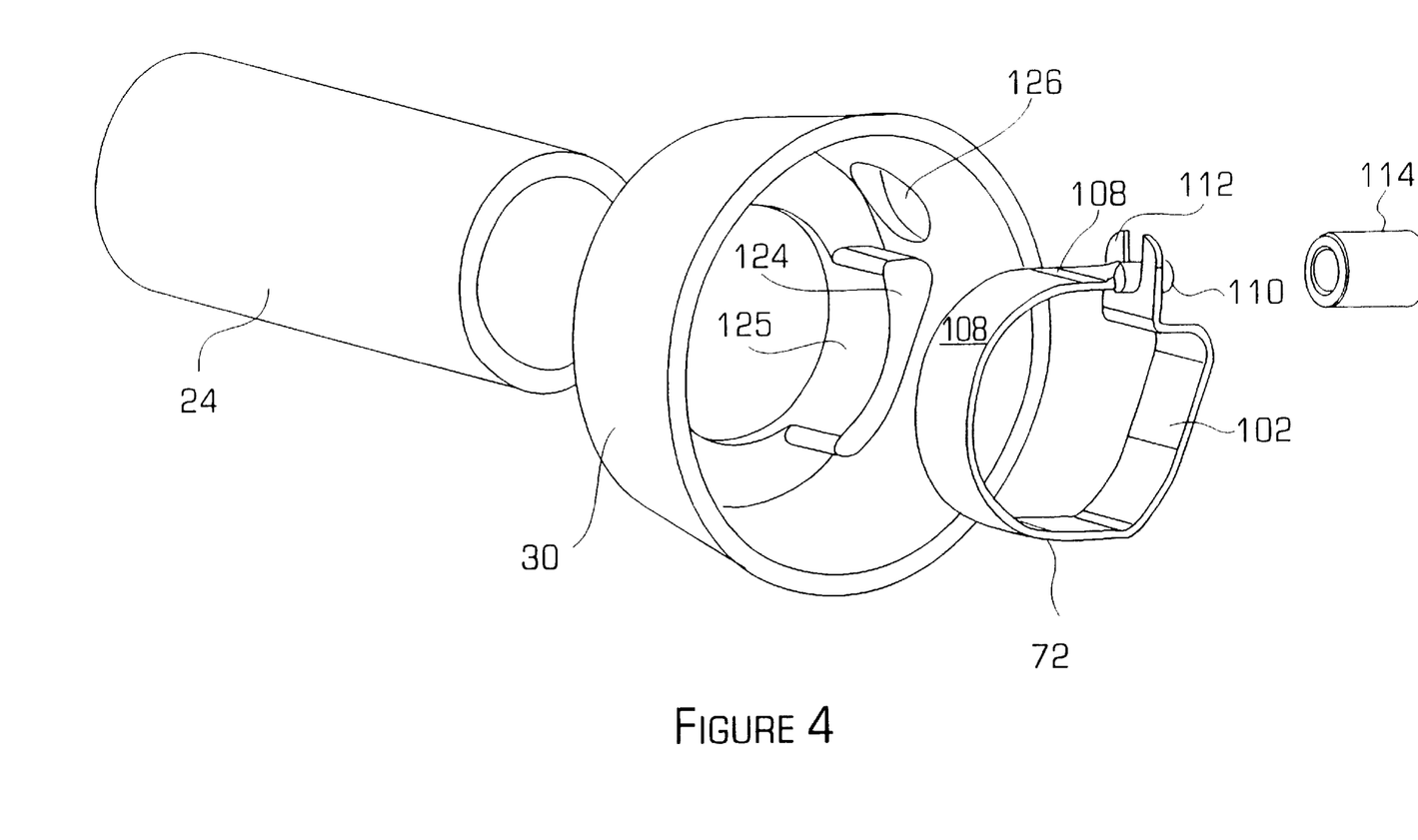
FIG. 4 is an exploded diagram illustrating the assembly of the outer body and a clamp in accordance with the invention.

With reference to FIGS. 3A, 3B and 4, the clamp 72 and the spring 74 in accordance with the invention will be described. The clamp 72 may have a first curved portion 102 that has a shape of the wedge portion 100 to securely hold the housing 30 to the handlebar. A second arcuate portion 108 of the clamp, which is not on top of the wedge portion 100, has a shape which is curved to fit snugly around the curvature of the handlebar. At the end of the second portion 108 is a threaded portion 110 which fits through a forked portion 112 of the clamp and is used to tighten the clamp onto the handlebar 24 with the nut 114.

To mount the spring 74 on top of the clamp 72, the spring may include first and second flat ends 121, 122 which may slide on the top of the clamp 72. The clamp 72 may include first and second projections 116, 117 on the outside of the clamp which prevent the spring ends 121, 122 from sliding more than a predetermined distance in either direction on top of the clamp. To hold the spring 74 on top of the clamp 72, the fixed housing may include a first overhang portion 118 and a second overhand portion which captures, in combination with the projections 116, 117, the spring by its ends 121, 122 when the handlebar mounted shifter is assembled. As shown, the end of the overhand portions 118, 119 may be located above the projections 116, 117 on the clamp 72 to ensure that the spring is captured on top of the clamp 72.

The clamp 72 may be constructed out of spring metal or any other suitable material which has sufficient resilience and strength to be tightened around the tubular handlebar 24 and to secure the fixed housing to the handlebar. The screw end 110 may slidably fit through a member 112, that may be, for example, a U-shaped forked member or a piece with a hole, that is attached to the first portion 102. The forked member holds the screw end. A nut 114 may screw onto the screw end 110 to tighten the clamp onto the handlebar 24.

The fixed housing portion 30 may include a ledge portion 124 having a cutout wedge region 125 in the inner surface of the fixed housing portion. The cutout wedge region may receive the portion of the clamp 102 above the wedge 100 and rigidly connect the clamp 72 to the fixed housing portion 30. Thus, once the clamp is tightened onto the handlebar, the fixed housing 30 is also fixed to the handlebar. The fixed housing may also include an access port 126, which may be, for example, a hole in the fixed housing, through which the nut 114 may be tightened which tightens the clamp 72 onto the handlebar 24. The access port may also be an opening formed by the joining two pieces of material in which each piece has a matching semicircular cutout. When the clamp 72 is seated within the cutout wedge region 125 and is secured to the tubular handlebar 24, the nut 114 protrudes from the access port 126. The nut protruding through the access hole may help secure the clamp 72 to the fixed housing 30.

Thus, to secure the fixed housing portion rigidly to the handlebar 24, the fixed housing is slipped over the handlebar and the clamp 72 is placed around the handlebar in a loose position and seated in the cutout wedge region 125. Then, when the fixed housing portion is properly positioned, the nut 114 may be rotated through the access port 126 which tightens the clamp around the handlebar 24 and secures the clamp and the fixed housing to the handlebar due to the frictional force between the handlebar, the wedge, and the clamp. Once the nut 114 is tight, the cable cover 86 may be closed and secured by the wingscrew to keep mud out of the cable. Now, the details of the spring in accordance with the invention will be described.

Figure 5A:
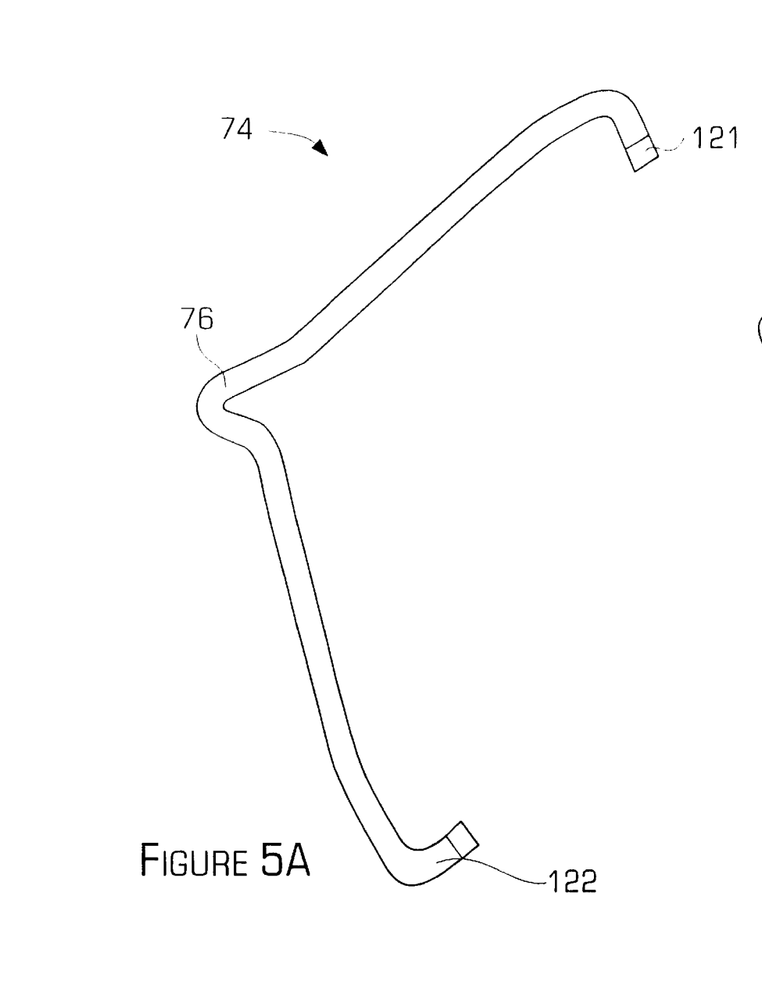
FIG. 5A is a front view illustrating the spring in accordance with the invention.
Figure 5B:
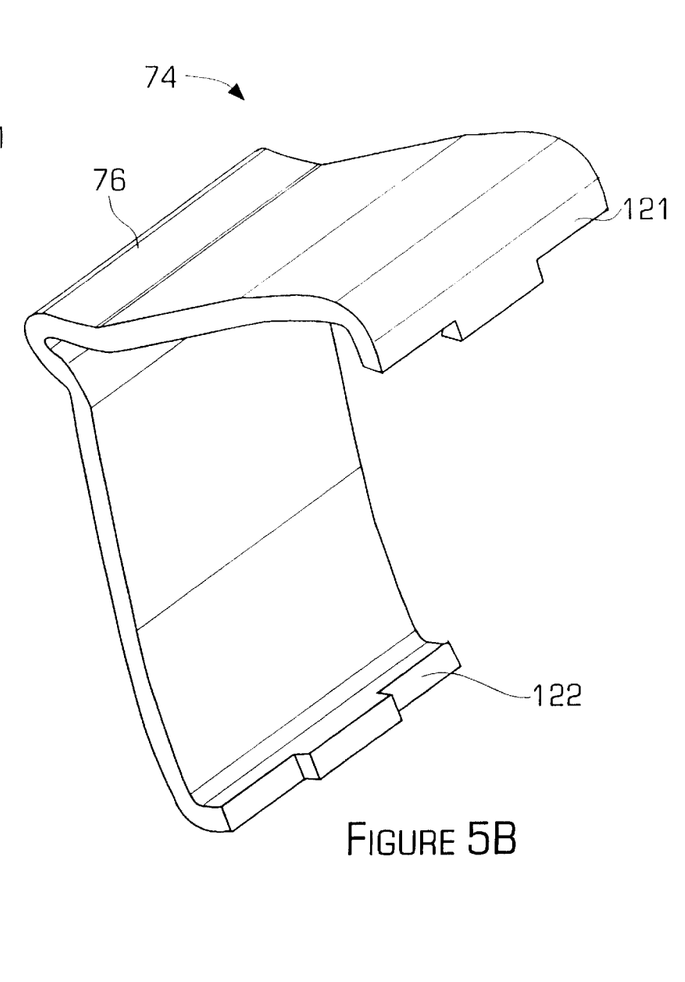
FIG. 5B is an isometric view illustrating the spring of FIG. 5A.

FIGS. 5A and 5B are diagrams illustrating the spring 74 in accordance with the invention. The spring 74 may have an arcuate shape and a central detent 76. The spring 74 may also have the first and second ends 121, 122 wherein both ends of the spring may slide on the arcuate portion of the clamp. The curvature of the arcuate shape of the spring approximately matches the curvature of a handlebar.

Figure 6:
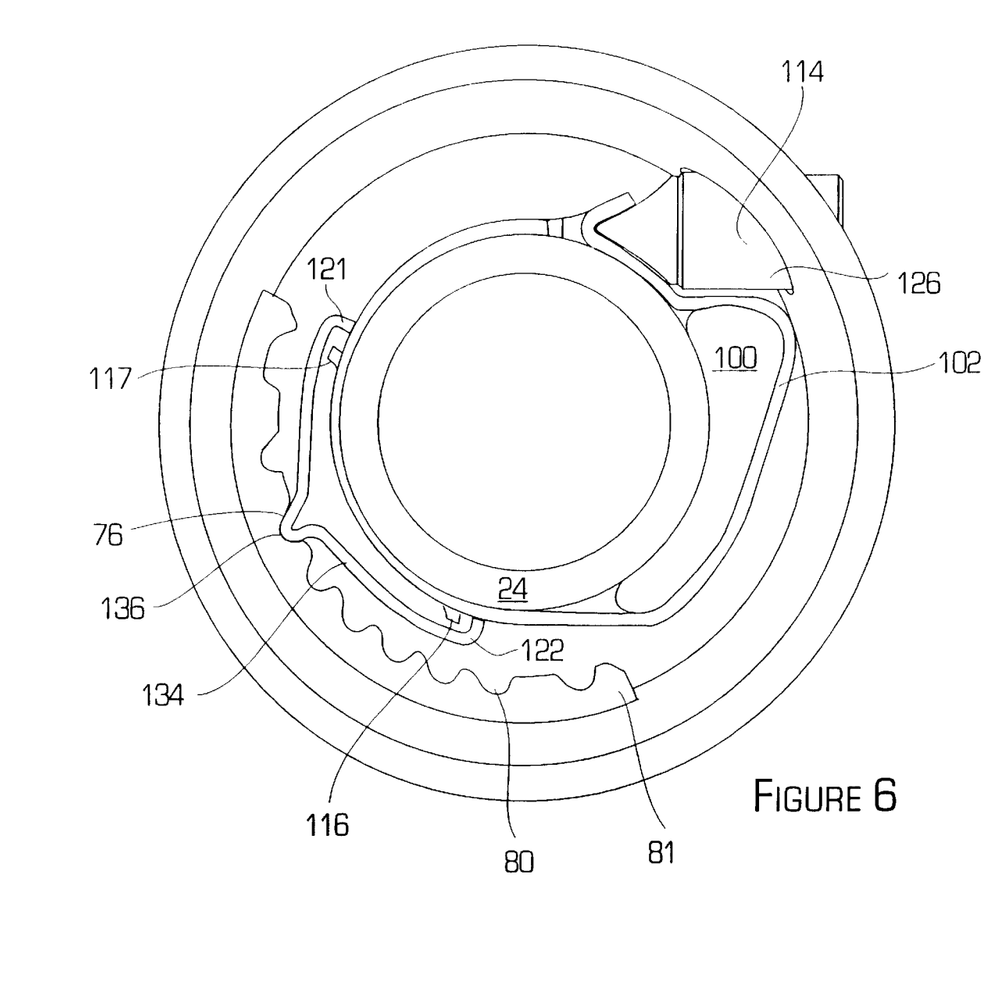
FIG. 6 is an front view illustrating the interaction of the combined clamp and spring assembly with the index valleys of the cable drum in accordance with the invention.

FIG. 6 is a diagram illustrating the interaction of the spring and the plurality of valleys 80 in the ledge portion 81 of the rotatable portion that extends into the fixed housing. The spring 74 may be slidably mounted on the clamp 72. As described above, the movement of the spring 74 on the clamp may be limited by the projections 116, 117 on the outside of the clamp 72. As described above, in the middle of the spring, the detent 76 may be formed which interacts with the plurality of valleys 80 in the rotatable portion to provide index shifting in which the grip and rotatable portion may be rotated a plurality of predetermined amounts to fixed positions based on the interaction of the spring 74 with the valleys 80. As shown, the spring is slidably mounted on the outside the clamp, and forms a single assembly which is thinner than a spring and a separate clamp. This single assembly reduces the overall diameter of the shifter system in accordance with the invention.

The spring may include the first and second ends 121, 122, a central convex portion 134 attached between the two ends 121, 122 and the curved detent portion 76. Both ends of the spring may slide on the outer surface of the clamp. The spring may be held onto the clamp by the projections 116, 117 in combination with the overhangs 118, 119 as shown in FIGS. 3A and 3B. The interaction of the spring detent 76 and a valley 136 on the rotatable portion permits the rider to accurately shift between gears which is known as index shifting.

Figure 7A:
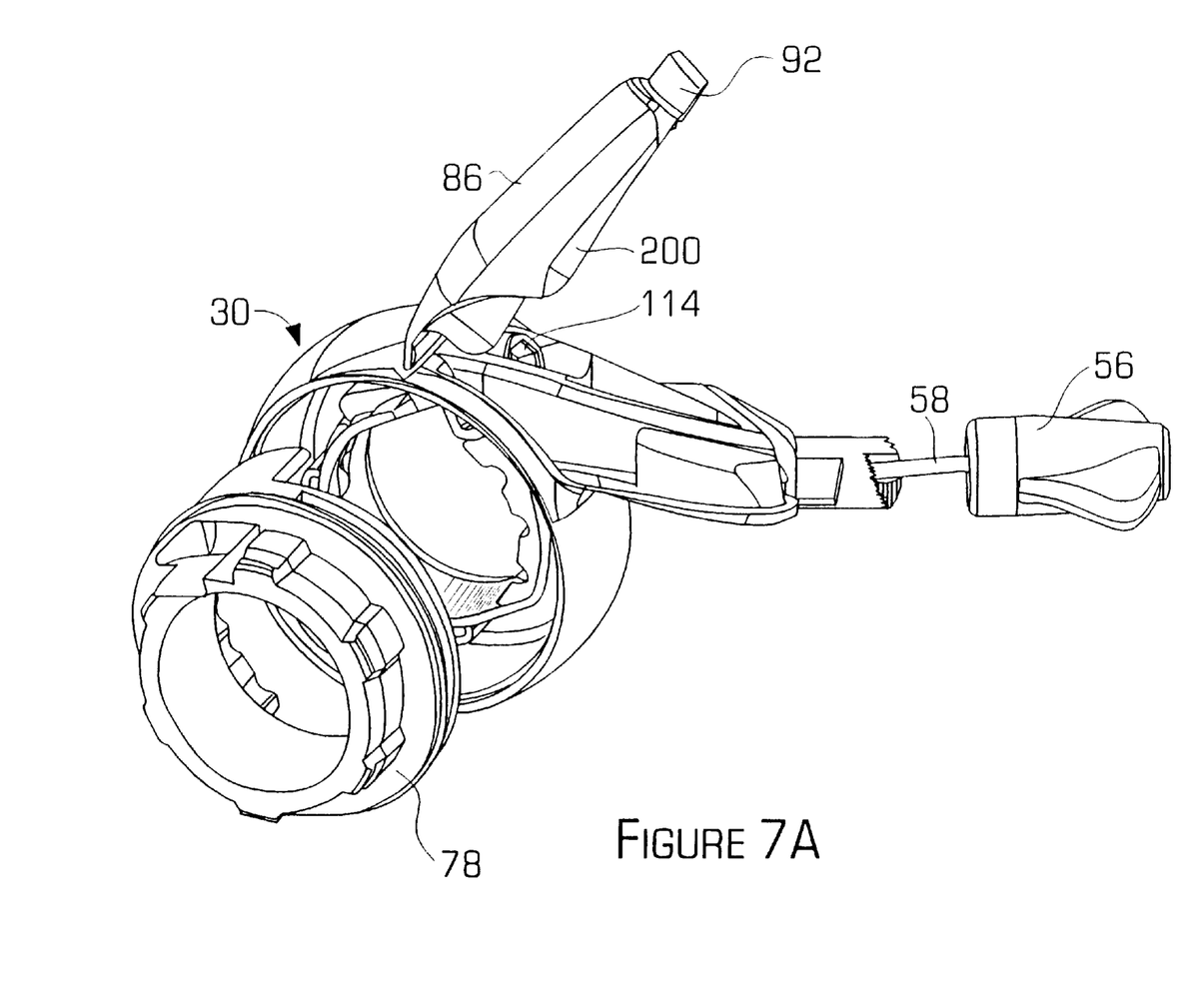
FIGS. 7A–7C illustrate the housing and the cable cover in accordance with the invention.
Figure 7B:
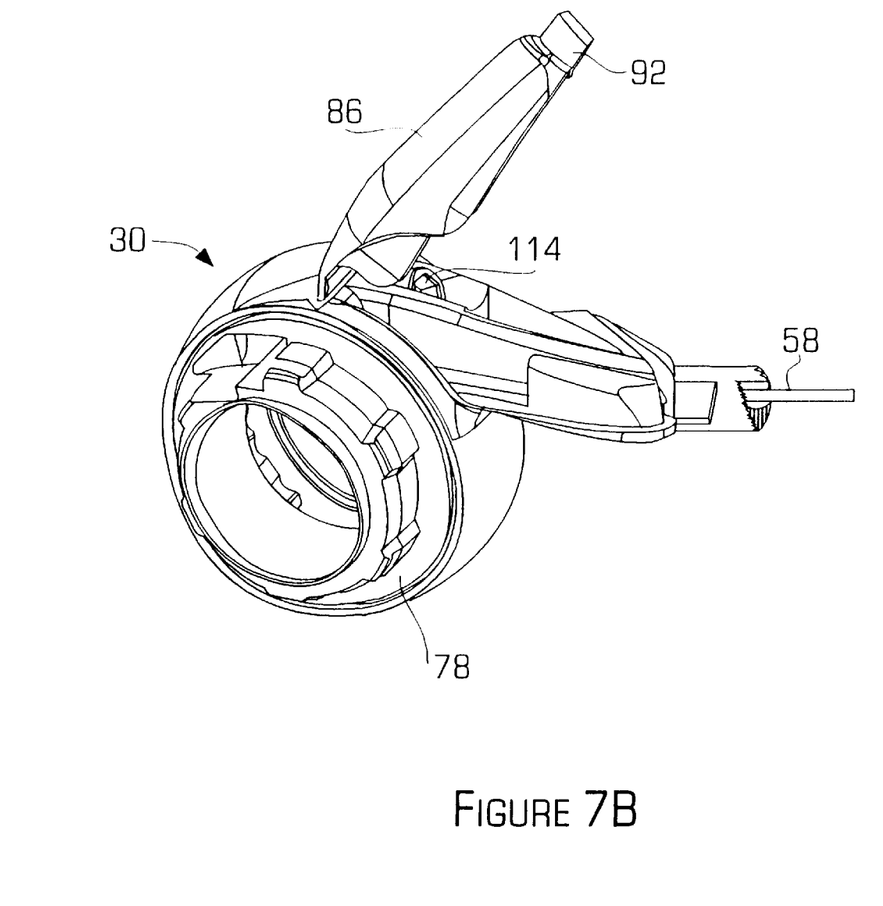
Figure 7C:
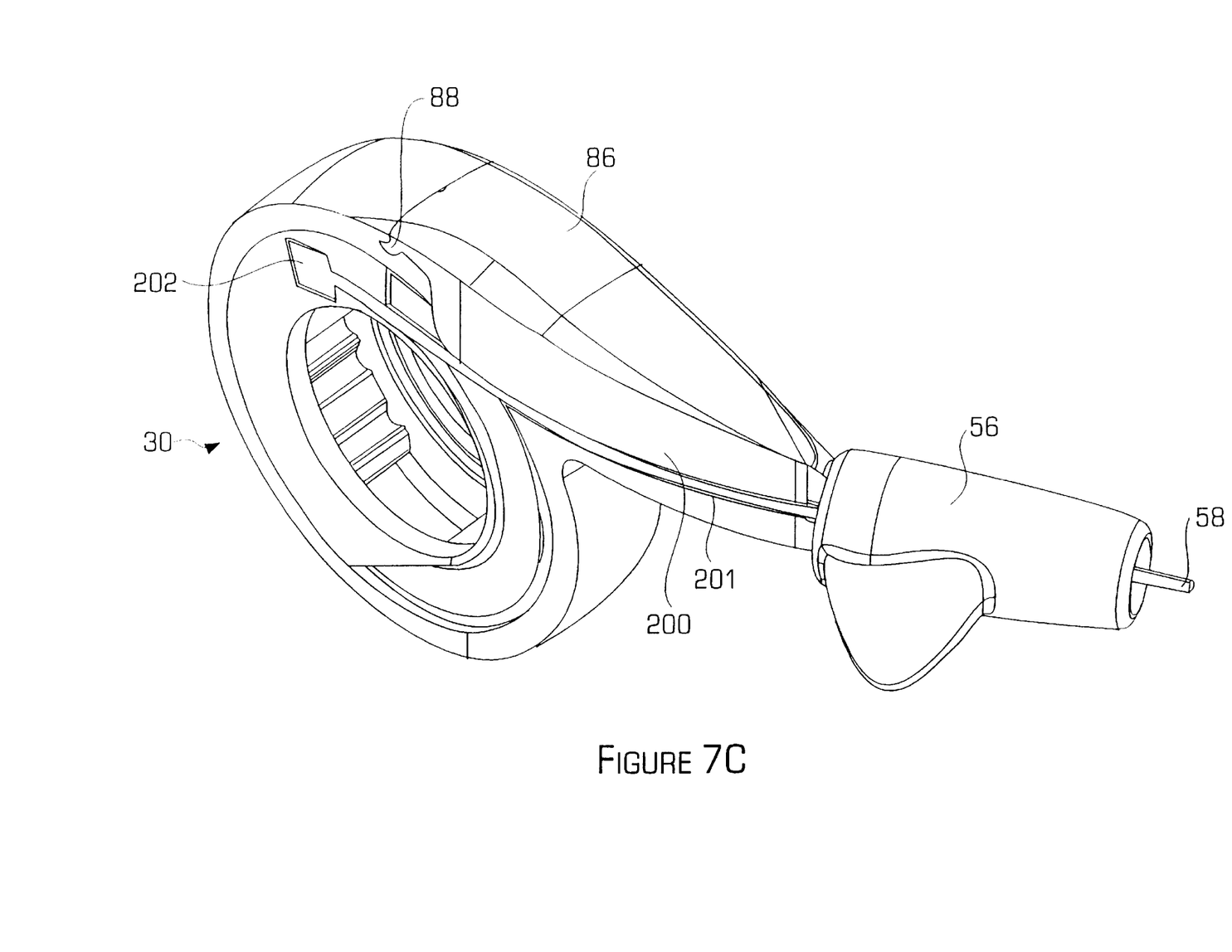

FIGS. 7A, 7B and 7C are diagrams illustrating the housing 30, the rotating portion 78 and the cable cover 86. FIGS. 7A and 7B show cable cover 86 is an open position while FIG. 7C shows the cable cover 86 in a closed position secured by the wingscrew 56. When the cable cover 86 is open, the tightening nut 114 is exposed and the clamp may be tightened without further disassembly of the handlebar mounted shifter. As describes above, the securing portion 92 may secure the cable cover 86 is a closed position.

When the cable cover has been closed and secured by tightening the wingscrew 56 over the securing portion 92 as shown in FIG. 7C, a wall 200 of the cable cover 86 presses the shifting cable 58 down against a bottom surface 201 of the housing 30. Thus, the shifting cable 58 is supported at and guided through all portions of the shifter so that the shifting cable cannot flex in any direction. During shifts when large pushing and pulling forces are applied to the shifting cable, any space into which the cable may flex may permit the shifting cable to move into that space so that the accurate positioning of the derailleur to which the cable is attached cannot be ensured which may cause a mis-shift. For example, if there is a lot of friction on the shifting cable due to, for example, mud within the cable sheath near the rear derailleur, additional force to shift the gears of the bicycle must be applied by the rider to the shifting cable and this additional force may cause the shifting cable, if it is not supported by the wall, to flex which causes the shifter to improperly shift. In accordance with the invention, from a cable end 202 of the shifting cable 58, the entire length of the shifting cable while it is within the handlebar mounted shifter is supported and guided so that the shifting cable does not inadvertently flex.

Figure 8A:
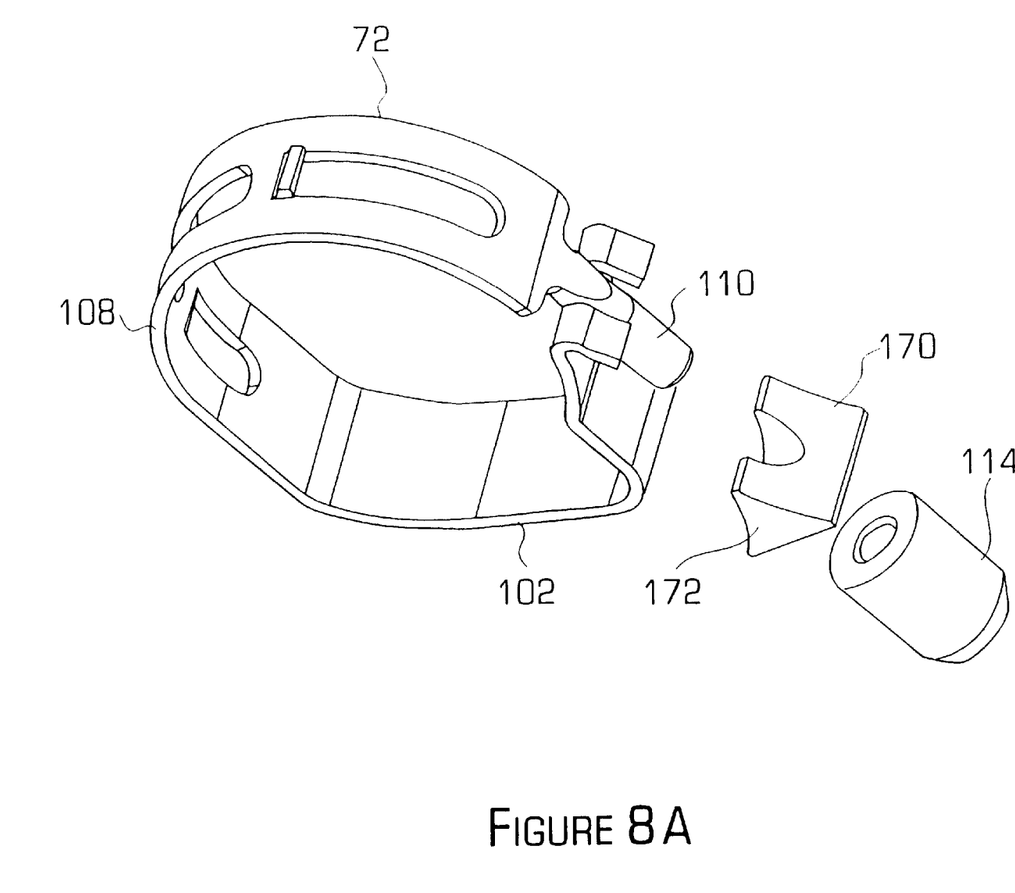
FIG. 8A illustrates an embodiment of a mechanism for lowering the torque that must be applied to a nut to tighten the clamp.

FIG. 8A is a diagram illustrating an embodiment for a mechanism for applying a larger force to secure the clamp 72 to a handlebar (not shown) while reducing the torque that must be applied to the nut 114. As shown in FIG. 8A, the clamp 72 is tightened by the nut 114. To increase the gripping force the clamp may apply to the handlebar while reducing the torque that must be applied to the nut 114, a portion 170 of material which may be steel or an alloy, is inserted between the nut 114 and the portion 110 of the clamp 72 onto which the nut is threaded. The portion 170 presses the clamp down on top of the handlebar to reduce the amount of torque that must be applied to the nut 114 to secure the handlebar mounted shifter to the handlebar. The invention is not limited to any particular shape of the portion 170 although several examples of the shape of the portion 170 will be described. For example, the portion 170 as shown in FIG. 8A has a flat end portion 172 and a triangular shape and is fabricated by an extrusion, alloy, cutting or machining hole process.

In summary, the invention provides a handlebar mounted shifter that places a rider's hand in a good ergonomic position. In particular, the shifter actuator in accordance with the invention has a small diameter so that the hand of the rider is closer to the pivot point of the brake lever so that the brake lever has a larger angular rotation and the thumb perch is easy to actuate with a rider's thumb. The combined clamp and spring assembly significantly reduces the total diameter of the handlebar mounted shifter system so that a thumb perch may be placed ergonomically on the outside of the shifter which permits the rider of the bicycle to apply extra torque to shift the gears of the bicycle during muddy or wet conditions when the grip portion may be slippery.

While the foregoing has been with reference to particular embodiments of the invention, it will be appreciated by those skilled in the art that changes in this embodiment may be made without departing from the principles and spirit of the invention, the scope of which is defined by the appended claims.

What is claimed is:

1. A bicycle gear shifting system comprising:

a housing portion fixedly attached to a handlebar of a bicycle outboard of a brake actuator, said brake actuator comprising a brake lever; said housing portion having disposed therein a clamp for attaching said housing portion to said handlebar and a spring slidably mounted on said clamp;

a rotatable portion rotatably attached to the handlebar and slidably connected to the housing portion, the rotatable portion rotating relative to the housing portion and the brake actuator; and a grip portion, attached to the rotatable portion and rotatably attached to the handlebar so that a rider of the bicycle shifts between gears of the bicycle by rotating the grip portion and the rotatable portion of the shifting system with respect to the handlebar and the brake actuator, the rotatable portion and the housing portion having about the same diameter.

2. The system of claim 1, wherein said rotatable portion further comprises means for translating torque, generated by the rider, into rotation of the grip portion.

3. The system of claim 2, wherein said translating means comprises a region on the rotatable portion for pressing a thumb of the rider to generate torque to rotate the grip portion.

4. The system of claim 1, wherein said rotatable portion further comprises a region extending into said housing portion having a plurality of valleys, and said spring is biased into contact with said plurality of rotatable portion valleys.

5. The system of claim 4, wherein said spring comprises first and second end portions, a middle portion curved outwards away from the clamp and extending between the first and second end portions, and a detent located in the middle portion, the spring biasing the detent into engagement with said rotatable portion valleys.

6. The system of claim 1, wherein said housing portion comprises an inner surface having a cutout portion, and said clamp further comprises an angular portion that fits into the cutout portion of the housing portion to secure the clamp to the housing portion.

7. The system of claim 6, wherein said housing portion has further disposed therein a seal having fingers fitting into a wedge positioned away from the rider's hand and said angular clamp portion sits on said wedge such that upon tightening the clamp the clamp presses down on the wedge, which in turn presses the fingers of the seal onto the handlebar to prevent movement of the housing portion.

8. The system of claim 7, wherein the clamp has an arcuate portion which is curved to fit snugly around the handlebar.

9. The system of claim 1, wherein said housing portion comprises a cable cover comprising a wall for supporting and guiding a shifting cable.

10. A bicycle gear shifting system comprising:

a rotatable portion rotatably attached to a handlebar of a bicycle, the rotatable portion slidably connected to a fixed housing and comprising a plurality of valleys and means for translating torque generated by a rider into rotation of a grip portion;

said fixed housing for attachment to the handlebar of the bicycle outboard of the brake actuator, said brake actuator comprising a brake lever, said fixed housing comprising an assembly having a clamp for attaching said fixed housing to the handlebar of the bicycle and a spring slidably mounted on the clamp for interacting with the valleys of the rotatable portion to index predetermined rotations of the grip portion to shift gears of the bicycle; and said grip portion attached to the rotatable portion and rotatably attached to the handlebar of the bicycle so that the rider of the bicycle shifts between gears of the bicycle by rotating the grip portion and the rotatable portion of the shifter system with respect to the handlebar and the brake actuator.

11. The system of claim 10, wherein said spring comprises first and second end portions that slide on said clamp, a middle portion curved outwards away from the clamp and extending between the first and second end portions, and a detent in the middle portion to interact with the valleys of said rotatable portion.

12. The system of claim 10, wherein said housing comprises an inner surface having a cutout portion, and said clamp further comprises an angular portion that seats within the cutout portion of the housing to secure the clamp to the housing.

* * * * *